July 24, 1951
W. J. HUGHES
2,561,700
DIFFERENTIAL PRESSURE GAUGE
Filed Sept. 27, 1947
3 Sheets-Sheet 1
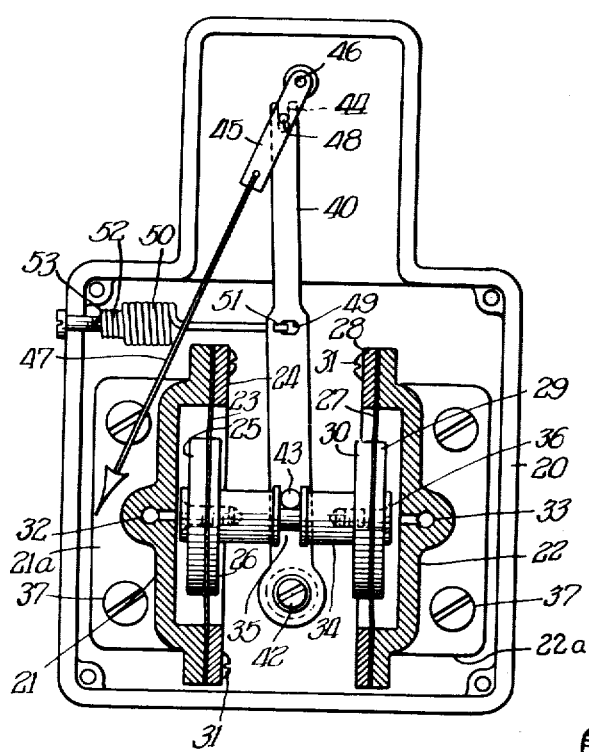
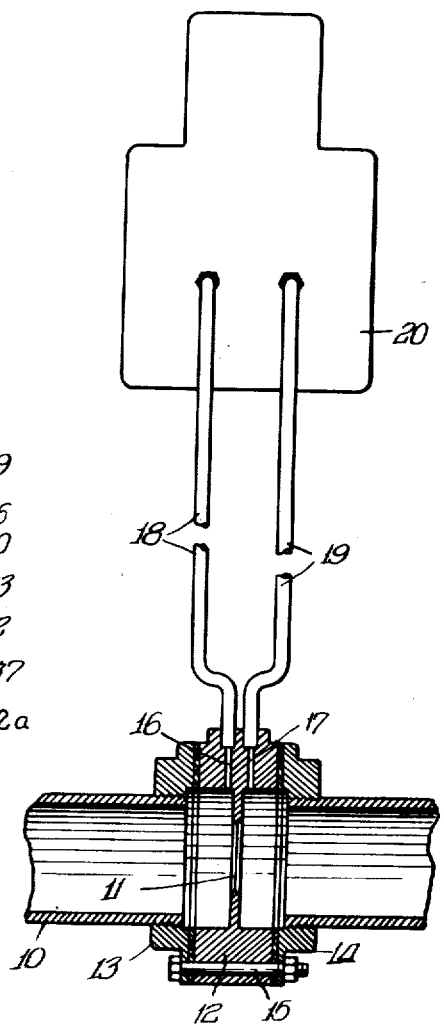
INVENTOR.
Walter J. Hughes
BY
Atty

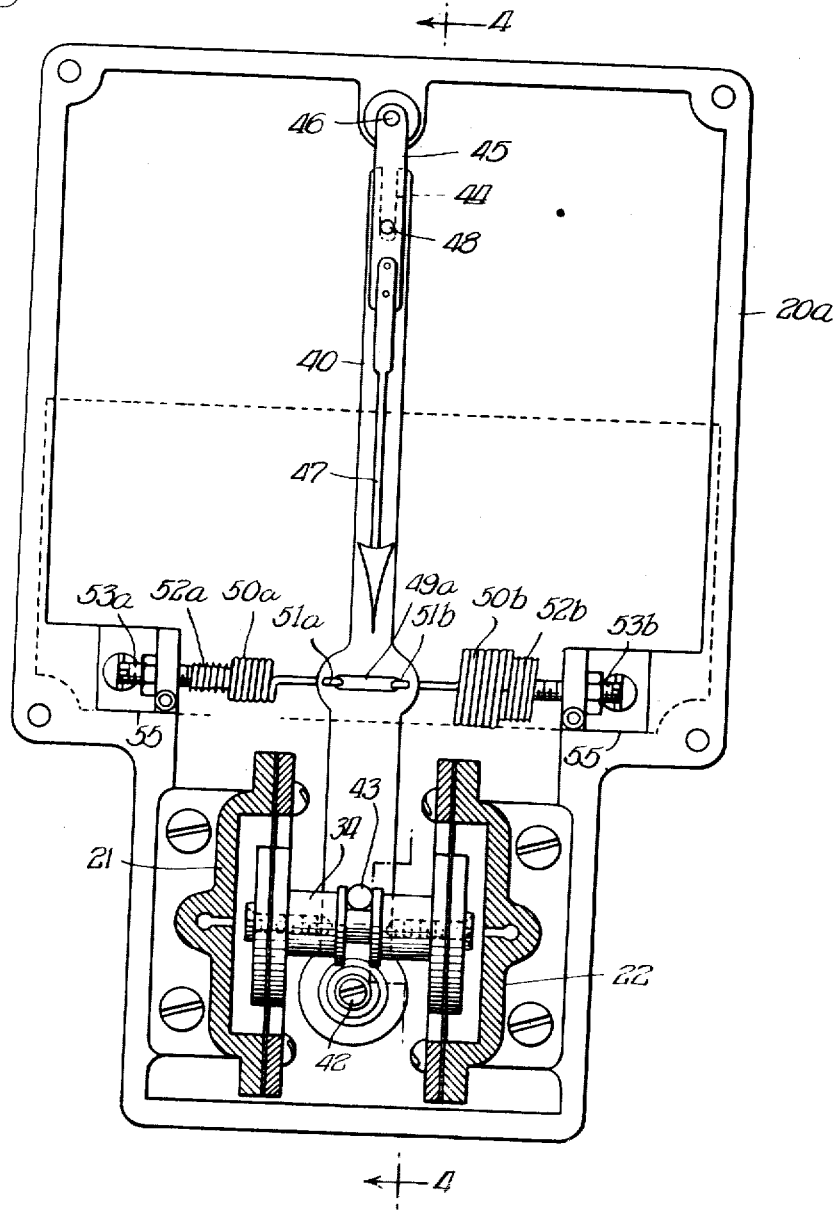

July 24, 1951  W. J. HUGHES  2,561,700
DIFFERENTIAL PRESSURE GAUGE
Filed Sept. 27, 1947  3 Sheets-Sheet 3
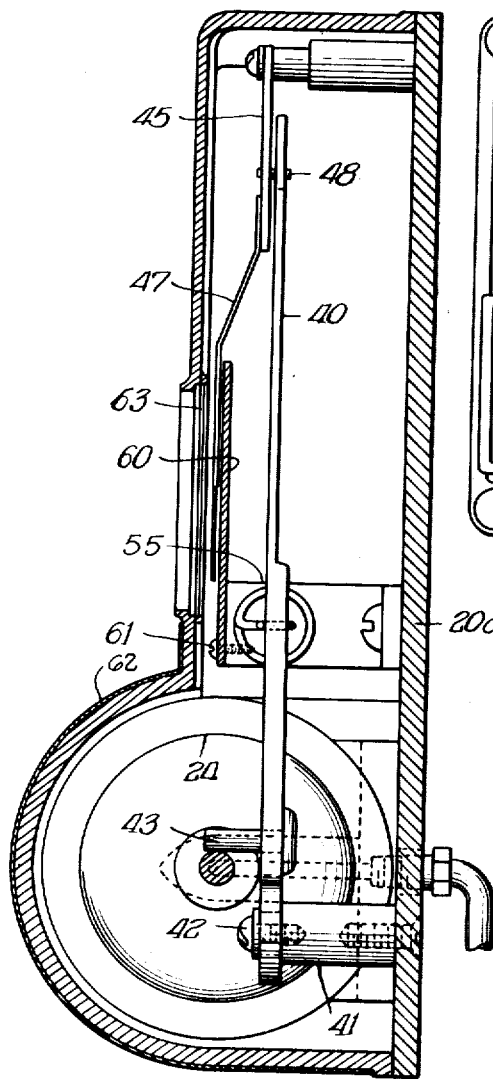
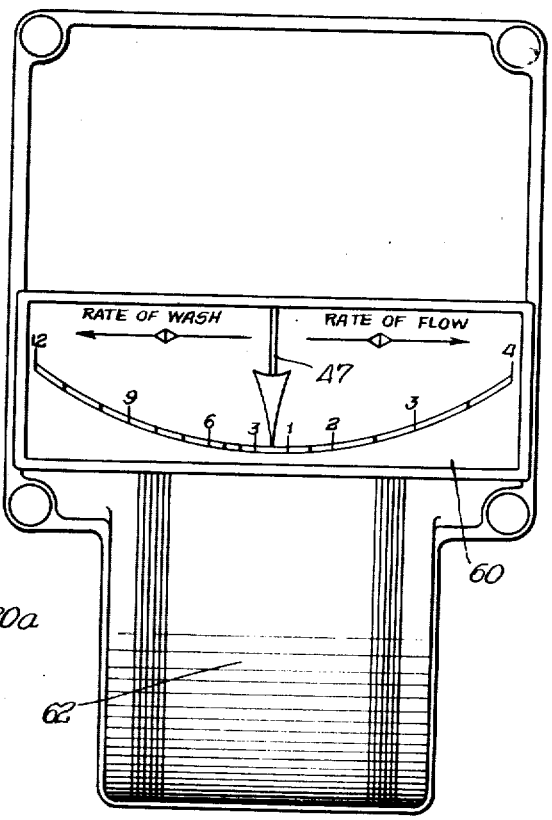
INVENTOR.
Walter J Hughes,
BY Patented July 24, 1951

2,561,700

UNITED STATES PATENT OFFICE 2,561,700

DIFFERENTIAL PRESSURE GAUGE

Walter J. Hughes, Chicago, Ill., assignor to Infilco Incorporated, Chicago, Ill., a corporation of Delaware Application September 27, 1947, Serial No. 776,571

3 Claims. (Cl. 73—397)

This invention relates to a gauge adaptable to measure a condition represented by a pressure differential, such as a rate of flow gauge, or the like.

One of the objects of this invention is to provide an improved rate of flow gauge.

Another object of this invention is to provide a gauge adapted to operate from a loss in pressure between two points in a system, such as a rate of flow gauge in a flow conduit, or a loss of head gauge adapted to indicate the condition of a filter, or the like.

Another object of this invention is to provide a flow gauge adapted to measure flows of different values and different directions, such as a gauge to indicate the rate of flow through a filter system under normal operating conditions and the rate of flow of wash water in a reversed direction and at much greater rate of flow.

These and other objects of my invention will be apparent from the description and claims which follow.

One most important use of my invention is a rate of flow gauge which can be a single function gauge to indicate a rate of flow in a single direction, or a double function gauge to indicate the value and direction of flows when flows through the conduit may be in different directions and at different values. However, it will be obvious that these are not the sole uses of my gauge, as it obviously is adapted to measure any condition which is, or can be, represented by a differential pressure, or a loss in pressure between two points of a system. For example, the single function gauge may have one side connected to the inlet of a filter and the other side connected to the outlet thereof and the gauge used to indicate the state of the filter bed, which is indicated by the amount of loss of head due to resistance to flow through the filter bed. Where a flow is controlled to a fixed value, as it ordinarily is through a filter, the measure in loss of head is an indication of the condition of the filter bed and enables the operator to judge the time at which the filtering function should be terminated and backwashing or reconditioning should begin. Other uses of the gauge will be obvious to those skilled in the art. However, for purposes of illustration, I will describe my invention in connection with a rate of flow gauge adapted to indicate the value of a flow through a conduit.

Briefly, my invention comprises a pair of diaphragm chambers with associated diaphragms, one chamber being connected to a point of high pressure in the system and the other to a point of low pressure. The two diaphragms are connected by a spacer bar and act in opposing directions. Movement of the spacer bar positions a lever which in turn positions a pointer which indicates the rate of flow. Motion of the lever is opposed by a tension spring, which, as is well known, exerts a force directly proportional to its elongation. Thus the pressure differential will be balanced by the force of the spring, and the pointer will be positioned along a scale, according to the magnitude of the forces.

My invention will be more readily understood from a consideration of the more detailed description which follows and the drawings in which:

Figure 1 represents a vertical cross-sectional view of a single function gauge, with cover and scale removed, such as that adapted to indicate the value of a flow through a system in one direction;

Figure 2 represents a back view of the gauge of Figure 1, together with the flow system in which it may be interposed;

Figure 3 is a vertical cross-sectional view of a double function gauge, with cover and scale removed, which is adapted to measure flows through a conduit when the direction of flow changes from time to time;

Figure 4 is a cross-sectional view of the gauge shown in Figure 3, including cover and scale dial, taken along the planes indicated by the line 4—4 in Figure 3;

Figure 5 is a front view, on a reduced scale, of the gauge shown in Figures 3 and 4.

For purposes of illustration, my invention will be described in connection with the measurement of a flow through a conduit such as pipe 10 shown in Figure 2. Various means are known for developing a differential pressure, or loss of pressure, between two points in a flow system, such as the use of the well known Venturi tube. A Venturi tube is an efficient means of creating such a differential and would ordinarily be preferred for use in connection with a uni-directional flow. However such tubes are not adaptable to creating pressure differentials when flow is in a reverse direction unless associated with a complex system of piping, which it is desirable to avoid. I, therefore, prefer to use a fixed orifice 11 which can be inserted in the pipe 10. The orifice 11 can be of any suitable style, but for purposes of illustration I show an orifice plate 12 clamped between the flanges 13 and 14, the assembly being held together by any suitable means, such as bolts 15. If flow is from left to right in Figure 2 the pressure on the left hand side will be greater than on the right hand side. Conversely, if flow is from right to left then the pressure on the right hand side becomes higher than on the left hand side of the orifice 11. The orifice plate is provided with pressure ports 16 and 17, which are adapted to be connected to pressure conduits 18 and 19, respectively, leading to the gauge, as shown. It is well known that the downstream connection in such an orifice should be a distance below the orifice corresponding to the position of the true vena contracta in order to obtain a true head for a given flow. In my apparatus, however, in order to avoid the necessity of switching connections each time the flow is reversed, I prefer to place the ports 16 and 17 adjacent to the orifice plate 11 and to calibrate the scale dial accordingly. Thus the dial is calibrated to flow head values which, while varying according to the equation Flow squared = head × 2 × gravity is modified by the fact that the downstream connection is out of position as explained above. Thus in order to save space and to avoid complex piping, the orifice chamber is modified as described, and the scale dial is calibrated accordingly.

Referring first to the single function gauge shown in Figure 1. The gauge mechanism is mounted on a suitable base plate 20 on the front of which is mounted a pair of opposed pressure chambers 21 and 22. As shown in the drawings these chambers may have integral mounting brackets 21a and 22a respectively which are affixed to the front face of the base plate 20 by any suitable means, such as machine screws 37. Associated with the left hand pressure chamber 21, which in this gauge is the chamber which will be connected to the point of greater, or higher, pressure, is a diaphragm 23 which is clamped to the face of the chamber by a suitable clamping ring 24. The diaphragm 23 is provided with relatively large centering plates 25 and 26. Similarly the opposed pressure chamber 22, which in this gauge will be connected to the point of low pressure, is provided with a diaphragm 27 which is clamped thereto by a suitable clamping ring 28. The diaphragm 27 is provided with centering plates 29 and 30. The two clamping rings 24 and 28 are bolted to their respective chambers by any suitable means, such as machine screws 31. It is preferred that the diaphragm chambers 21 and 22 be of identical size and that the centering plates 25 and 26 and 29 and 30 be of identical size.

The diaphragms 23 and 27 should be of very thin and strong material, such as nylon impregnated with rubber or neoprene so as to provide a fluid-tight membrane of great flexibility. For this purpose I have used diaphragms having a thickness of from 0.013 to 0.018 inch. I have used such diaphragms even with pressures of considerable value, such as 50 to 100 pounds per square inch. Such diaphragms are exceedingly strong and, in my preferred construction, the gap between the diaphragm chamber and the centering plates is quite small. For example, I have used diaphragm chambers with an inner diameter of 1¾ inches, associated with which are centering plates with a diameter of 1¼ inches, leaving a gap of ¼ inch between the diaphragm chamber and the centering plates. The diaphragm then has an effective diameter of 1½ inches, an effective area of 1.76 square inches, and permits a traverse motion of 1/16 inch with respect to the neutral diaphragm position without distortion or upsetting of diaphragm forces.

A conduit 32 leads to the pressure chamber 21 from the back of the base plate, and is adapted to be connected to a high pressure conduit as shown in Figure 2. Similarly conduit 33 leads from the interior of the diaphragm chamber 22 from the back of the base plate and is adapted to be attached to a low pressure conduit.

The two exterior diaphragm center plates 26 and 30 are held in spaced relationship by a spacer bar 34 which is provided with a central peripheral slot 35. The assembly of centering plates and spacer bar is held in fixed position by any suitable means, such as bolts or machine screws 36.

A vertical lever 40 is mounted between the two diaphragm chambers 21 and 22. The lever 40 is supported by any suitable supporting bracket 41, mounted on the base plate 20 (see Figure 4) to which it is pinned by a machine screw 42. A pin 43 is mounted in the lever 40 in such a manner as to be enclosed within the slot 35 on the spacer 34, so that motion of the diaphragms and the spacer 34 is imparted to the lever 40. As the motion of the diaphragms will be exceedingly small it is necessary that their motion be magnified to provide a pointer operating over a readily readable scale. For this reason the lever 40 is relatively long and the fulcrum point is at the lower end of the lever. The upper end of the lever is provided with a longitudinal slot 44, as shown. Associated with the lever 40 is an indicator arm 45, pivoted at its upper end on pin 46 while the lower end is provided with a pointer 47 which is bent forward, as shown in Figure 4, to pass in front of a suitable scale. The pointer arm 45 carries a pin 48 which is slidably engaged in the slot 44 of the lever 40.

A tension spring 50 is so mounted as to pull the lever toward the high pressure chamber 21. In the drawing the tension spring 50 is shown as provided with a hook 51 which is inserted in a hole 49 in the lever 40 and the other end is mounted on a threaded spring mounting 52. The tension of the spring can be adjusted by rotation of the bolt 53, the threaded portion of which engages the threaded portion of the spring mounting 52. Both tension of spring and spring length (free) can be adjusted by such means, for the spring length at zero tension is the important adjustment. The force of the spring 50 is set so that when pressures in the two chambers 21 and 22 are equal the pointer 47 is pulled to the zero position. In this instance, the maximum graduation on the scale will be at the right and the zero position at the left.

When the pressures conducted to the two chambers 21 and 22 differ then the diaphragm assemblies and the connecting spacer 34 are moved toward the right by virtue of the fact that the pressure in the left hand chamber 21 is greater than in the right hand chamber 22. Such movement of the diaphragm assembly moves the lever 40 toward the right, which motion is magnified by the means described to cause the pointer 47 to move to the right through an angle which is readily readable on an appropriate scale. Motion of the lever 40 towards the right is opposed by the tension in the spring 50, the force of which varies directly with the amount of its elongation. Thus the diaphragm assembly will come to rest at a point in which the pressure difference between the two chambers is exactly balanced by the force of the spring 50 and this constitutes an accurate register of the amount of flow being measured.

The apparatus shown in Figures 3, 4 and 5, is essentially the same as that shown in Figure 1. The diaphragm chambers 21 and 22 are mounted in a casing 20a. As indicated above, this form is adapted to accurately measure the direction and value of flows going in opposite directions through the pipe 10. In this instance, the pointer arm 45 is in a vertical position when at a zero position and there is no flow through the conduit 10. This is shown particularly well in Figure 5 in which the pointer is shown at the zero position and moves to the right to measure a rate of flow in one direction and moves to the left from the zero position to measure a rate of flow in the opposite direction. As shown by the markings on the scale 60, these flows do not need to be of the same magnitude. To secure such operation it is necessary to use two springs 50a and 50b, one end of each being hooked in the slot 49a of the lever arm 40 and the other ends held on a threaded spring mounting 52a and 52b, respectively, which are carried by bolts 53a or 53b rotatably held in brackets 55. In this instance, the hole in which the hook portion of the two springs are inserted should be a slot so that the spring which is not in use at any particular moment will be free to slide in the slot. For example, assuming that a rate of flow is being measured which causes the pointer to move to the right, then the spring 50a will be under tension but spring 50b should be free to slide in the slot so as to avoid affecting movement of the lever arm 40.

In this form of apparatus, when the left hand chamber 21 is the high pressure chamber, the pointer 47 will be moved to the right from the neutral position through an angle proportional to the pressure difference between the two chambers. However when the direction of flow is reversed the right hand chamber 22 becomes the high pressure chamber and the diaphragm assembly will be moved to the left and the pointer 47 will be moved to the left from the zero position through an angle corresponding to the rate of flow. If the gauge is to be used for indicating the direction and magnitude of flows through a filter the magnitude to the flows to be measured will be quite different. In some instances, the rates or magnitude of flow in the two directions will be equal but ordinarily this is not true of flows through filters. In filter practice it is desired to backwash, in most installations, at a rate approximating three or four times that of the filtering flow. In such cases it is possible to equal the pointer travel in the two directions over the scale dial 60 by using springs having spring rates for the same deflection in the rates of 9 to 1. That is, assuming a filtering flow at three gallons per squart foot of filter area and an alongation of the spring 50a of one. When washing at the customary washing flow of nine gallons per square foot per minute then the elongation of the spring 50b should also be one. As the pressure differential varies as the square of the flow, it is obvious that the spring force of spring 50b should be nine times that of 50a in order to convert the squares of the flow into angular motion of similar magnitude.

The dial scale 60 can be mounted in front of the mechanism but behind the forwardly bent pointer 47 as shown in Figure 4. In this embodiment the scale is shown as mounted by any suitable means, such as machine screws 61, upon the brackets 55. The entire mechanism is enclosed in a suitable casing, or cover 62 of any suitable material. The casing 62 is provided with a window 63 of glass, or other transparent material, located immediately in front of the scale 60. When used in connection with a filter it ordinarily will be preferred that the values on the wash flow side of the gauge will be three to four times those on the rate of flow side, as shown by the graduations on the scale 60 in Figure 5.

While I have herein described, and in the drawing shown, illustrative embodiments of my invention it is to be understood that the invention is not limited thereto, but may comprehend other constructions, arrangement of parts, details and features, the equivalent thereof without departing from the spirit of this invention. Manifestly, the arrangement shown in capable of considerable modification by persons skilled in the art and any such modifications as are in keeping with the foregoing description and claims which follow are considered to be within the present invention.

I claim:

1. A gauge adapted to indicate the direction and magnitude of flow through a conduit comprising a casing, a pair of opposed diaphragm chambers mounted in said casing, said diaphragm chambers being adapted to be connected to points of different pressure in said conduit, diaphragms in said chambers, a spacer bar connecting said diaphragms, a lever arm pivotally pinned to a lower portion of said casing and slidably pinned to said spacer bar, a pair of tension springs, a slidable connection between each of said springs and said lever arm, one on each side thereof, whereby one of said springs is inactive while the other is under tension, and a pointer pivotally mounted at an upper portion of said casing above the upper end of said lever arm and slidably pinned to said lever arm.

2. A gauge adapted to indicate the direction and magnitude of flows of different ranges through a conduit having a pressure differential creating restriction therein, said gauge comprising a pair of opposed diaphragm chambers, diaphragms across opposing faces of said chambers, a spacer bar connecting said diaphragms, a lever arm pivoted at it lower end and positioned by movement of said spacer bar, said lever arm having a slotted portion, tension springs slidably connected to said slotted portion, one on each side thereof, said tension springs having different spring rates, the proportion of the spring rate of the larger spring to that of the smaller spring being equal to the proportion of the square of the greater flow range to that of the lesser flow range, a pointer pivoted at its upper end and positioned by said lever arm, and means for connecting said diaphragm chambers to said conduit on opposite sides of said pressure differential creating restriction.

3. A gauge adapted to indicate the direction and magnitude of flows of differing ranges through a conduit having a pressure differential creating restriction therein, said gauge comprising a casing, a pair of opposed diaphragm chambers mounted in said casing, means adapted to connect said chambers to said conduit on opposite sides of said restriction, diaphragms across opposing faces of said chambers, a spacer bar connecting said diaphragms, a lever arm positioned by movement of said spacer bar, said lever arm having a slotted portion, a tension spring of one spring rate slidably connected to said slotted portion on one side of said lever arm and opposing motion thereof in one direction, a second tension spring of another spring rate slidably connected to said slotted portion on the other side of said lever arm and opposing motion thereof in the other direction, the proportion of the spring rate of the larger spring to that of the smaller spring being equal to the proportion of the square of the greater flow range to that of the lesser flow range, a pointer having its fulcrum above the upper end of said lever arm and slidably pinned to the upper end of said lever arm, and a graduated dial mounted on said casing in a plane behind the plane of movement of said pointer.

WALTER J. HUGHES.

REFERENCES CITED

The following references are of record in the file of this patent:

UNITED STATES PATENTS

| Number | Name | Date |
|---|---|---|
| 750,752 | Cole | Jan. 26, 1904 |
| 2,005,773 | De Florez | June 25, 1935 |
| 2,052,720 | MacLean et al. | Sept. 1, 1936 |
| 2,199,013 | Sprague | Apr. 30, 1940 |
| 2,444,358 | Markson et al. | June 29, 1948 |

FOREIGN PATENTS

| Number | Country | Date |
|---|---|---|
| 14,903 | Great Britain | June 27, 1910 |